United States Patent
Liu et al.

(10) Patent No.: US 10,148,109 B2
(45) Date of Patent: Dec. 4, 2018

(54) CHARGE WAKE-UP CIRCUIT FOR A BATTERY MANAGEMENT SYSTEM (BMS)

(71) Applicant: Hefei University of Technology, Hefei (CN)

(72) Inventors: Xintian Liu, Hefei (CN); Yao He, Hefei (CN); Xinxin Zheng, Hefei (CN)

(73) Assignee: Hefei University of Technology (CN)

( * ) Notice: Subject to any disclaimer, the term of this patent is extended or adjusted under 35 U.S.C. 154(b) by 94 days.

(21) Appl. No.: 15/096,817

(22) Filed: Apr. 12, 2016

(65) Prior Publication Data
US 2017/0163064 A1 Jun. 8, 2017

(30) Foreign Application Priority Data
Dec. 4, 2015 (CN) .......................... 2015 1 0895262

(51) Int. Cl.
H02J 7/00 (2006.01)
B60L 3/00 (2006.01)
H01M 10/48 (2006.01)

(52) U.S. Cl.
CPC .......... *H02J 7/0052* (2013.01); *B60L 3/0046* (2013.01); *H01M 10/482* (2013.01)

(58) Field of Classification Search
CPC ........................................... H02J 7/00
USPC .......................................................... 320/107
See application file for complete search history.

(56) References Cited

U.S. PATENT DOCUMENTS

| 3,668,514 A * | 6/1972 | Peck ..................... H02J 7/1438 290/40 R |
| 2002/0163321 A1 * | 11/2002 | Harmon ................. H02J 7/242 322/28 |
| 2010/0085008 A1 * | 4/2010 | Suzuki ..................... B25F 5/00 320/112 |
| 2013/0285638 A1 * | 10/2013 | Ma .......................... G06F 1/266 323/349 |
| 2014/0048901 A1 * | 2/2014 | Imagawa ................ H02M 7/06 257/471 |
| 2014/0312828 A1 * | 10/2014 | Vo ..................... H01M 10/4257 320/103 |
| 2017/0163064 A1 * | 6/2017 | Liu ....................... H02J 7/0052 |

* cited by examiner

*Primary Examiner* — Mohammed Alam
(74) *Attorney, Agent, or Firm* — Dickinson Wright PLLC

(57) ABSTRACT

A charge wake-up circuit for a battery management system ("BMS") for an electric vehicle, the circuit including a charging plug connection circuit, a comparator circuit, and a DC wake-up circuit. The charge wake-up circuit monitors the state of the charger after the BMS turns off. If the charger charges the battery pack after the BMS turns off, the BMS will be started by the charge wake-up circuit and continue to monitor the battery pack. If the charger is off-line, the BMS will maintain the low-power state to prevent the automotive lead-acid battery from over-discharging.

1 Claim, 1 Drawing Sheet

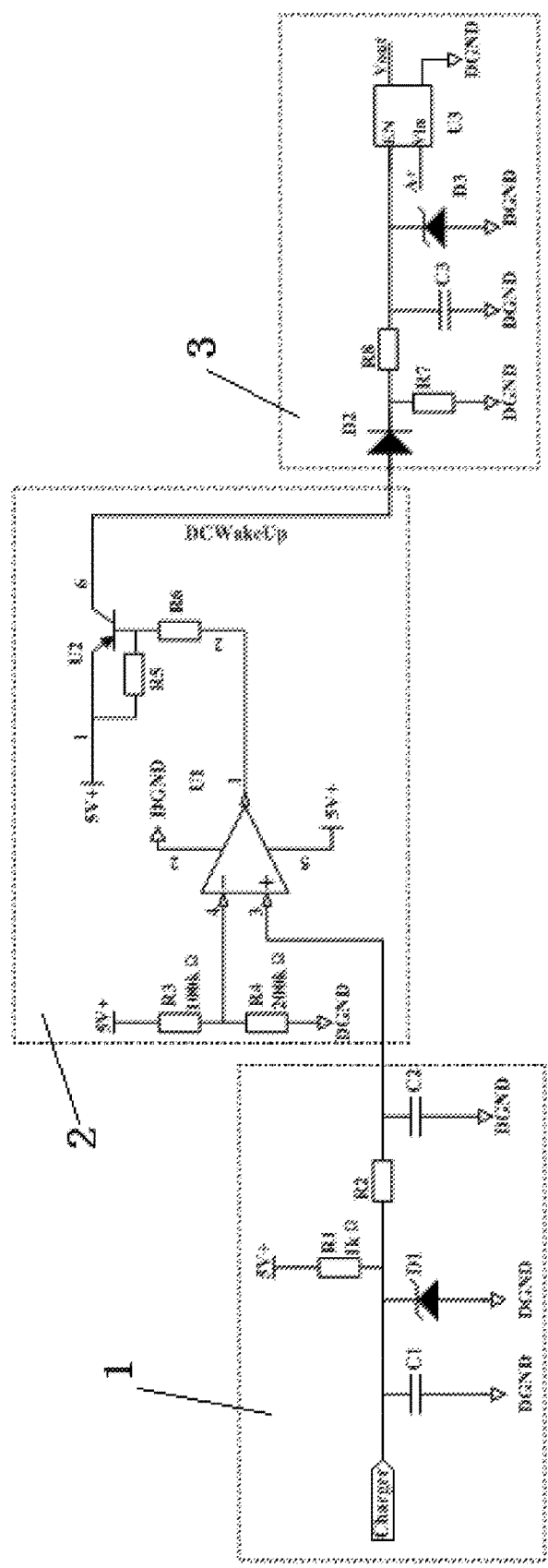

CHARGE WAKE-UP CIRCUIT FOR A BATTERY MANAGEMENT SYSTEM (BMS)

CROSS-REFERENCE TO RELATED APPLICATIONS

The present invention is related to, and claims the benefit of priority from, Chinese Patent Application 201510895262.3, filed 4 Dec. 2015, the disclosure of which application is incorporated herein by reference in its entirety.

FIELD OF THE INVENTION

This invention relates to the area of battery management system ("BMS") technology and, particularly, to a charge wake-up circuit for a BMS.

BACKGROUND

When an electric vehicle is not being driven, the BMS needs to be in power-off state or low-power state. Otherwise, the automotive lead-acid battery, which power to the BMS, will be discharged to the over-discharge state to damage the lead-acid battery itself and cause the electric vehicle fail to start at the next time. When the BMS is power-off, it needs to be powered manually when it is power-off and the lithium battery pack needs to be charged, which is very inconvenient. Thus, the best choice is that the BMS maintains the low-power state, and when the lithium battery pack needs to be charged, the charger will wake up the BMS to work. Moreover, the BMS is powered by the charger to protect the lead-acid battery from over-discharging. In this situation, the wake-up circuit is required.

SUMMARY OF THE DISCLOSURE

Aiming at the deficiencies of the prior technology, a charge wake-up circuit for BMS is proposed in this application. This invention is proposed as follows: A charge wake-up circuit for Battery Management System (BMS) includes charging plug connection circuit, comparator circuit, and DC wake-up circuit with the features as: the charging plug connection circuit contains filter capacitors C1 and C2, TVS diode D1, resistor R1 and limiting resistor R2 (see FIG. 1). The comparator circuit contains the comparator U1, transistor U2 and resistor R3, R4, R5, R6. And the DC wake-up circuit contains the anti-reverse diode D2, ground resistor R7, limiting resistor R8, filter capacitors C3, regulator diode D3 and DC power U3. The Charger port of the charging plug is connected to one port of filter capacitor C1, TVS diode D1, resistor R1 and limiting resistor R2. Another port of the filter capacitor C1 and TVS diode D1 are connected to the ground. Another port of the resistor R1 is connected to the voltage of +5V. Another port of the limiting resistor R2 is connected to the filter capacitor C2 and positive input of the comparator U1. Another port of the filter capacitor C2 is connected to the ground. The inverting input of the comparator U1 is connected to the resistor R3 and R4. Another port of resistor R3 is connected to the voltage of +5V. And another port of resistor R4 is connected to the ground. The output of comparator U1 is connected to resistor R6. Another port of resistor R6 is connected to the resistor R5 and the base of transistor U2, another port of resistor R5 and the collector of transistor U2 are connected to voltage of +5V, the emitter of transistor U2 is connected to the anode of anti-reverse diode D2. And the cathode of anti-reverse diode D2 is connected to the ground resistor R7 and limiting resistor R8, another port of ground resistor R7 is connected to the ground, another port of limiting resistor R8 is connected to filter capacitor C3, the cathode of regulator diode D3 and the EN port of DC power U3, another port of filter capacitor C3 and anode of regulator diode D3 is connected to the ground.

The charging plug connection circuit contains partial voltage resistor, limiting resistor and peripheral circuits. The main function of the circuit is to provide a voltage of 5V or 2.5V for the comparator circuit.

The comparator circuit contains a comparator and a PNP transistor. The main function of it is to output a voltage signal of 0V or +5V according to the different input voltage.

The DC wake-up circuit contains limiting resistor, diode, regulator diode and DC power. The main function of the circuit is to receive the voltage signal output from the comparator circuit, if the signal is high, the DC power will work to wake up the whole BMS, and if the signal is low, the BMS continues to maintain the low-power state.

The advantage of the invention is that, when the electric vehicle needs charging, the circuit will wake up the BMS from the low-power state to monitor the charging process, which is very convenient. And after the BMS being waked up, the BMS will be powered by the charger to protect the automotive lead-acid battery from over-discharging.

BRIEF DESCRIPTION OF THE DRAWINGS

FIG. 1 is the circuit of the invention.

WRITTEN DESCRIPTION

As exemplified in FIG. 1, a charge wake-up circuit for a Battery Management System ("BMS") includes charging plug connection circuit 1, comparator circuit 2, and DC wake-up circuit 3 with the features as: the charging plug connection circuit contains filter capacitors C1 and C2, TVS diode D1, resistor R1 and limiting resistor R2. The comparator circuit contains the comparator U1, transistor U2 and resistor R3, R4, R5, R6. And the DC wake-up circuit contains the anti-reverse diode D2, ground resistor R7, limiting resistor R8, filter capacitors C3, regulator diode D3 and DC power U3. The Charger port of the charging plug is connected to one port of filter capacitor C1, TVS diode D1, resistor R1 and limiting resistor R2. Another port of the filter capacitor C1 and TVS diode D1 are connected to the ground. Another port of the resistor R1 is connected to the voltage of +5V. Another port of the limiting resistor R2 is connected to the filter capacitor C2 and positive input of the comparator U1. Another port of the filter capacitor C2 is connected to the ground. The inverting input of the comparator U1 is connected to the resistor R3 and R4. Another port of resistor R3 is connected to the voltage of +5V. And another port of resistor R4 is connected to the ground. The output of comparator U1 is connected to resistor R6. Another port of resistor R6 is connected to the resistor R5 and the base of transistor U2, another port of resistor R5 and the collector of transistor U2 are connected to voltage of +5V, the emitter of transistor U2 is connected to the anode of anti-reverse diode D2. And the cathode of anti-reverse diode D2 is connected to the ground resistor R7 and limiting resistor R8, another port of ground resistor R7 is connected to the ground, another port of limiting resistor R8 is connected to filter capacitor C3, the cathode of regulator diode D3 and the EN port of DC power U3, another port of filter capacitor C3 and anode of regulator diode D3 is connected to the ground.

In charging plug connection circuit 1, when the charging plug is connected, the Charger port will access to a resistor of 1KΩ to form partial voltage circuit and output a voltage of +2.5V to the input port 3 of comparator U1. And when the charging plug is not connected, the circuit will output a voltage of +5V to the input port 3 of comparator U1. In this circuit, C1 and C2 is the filter capacitor, D1 is the TVS diode to protect the circuit from damage with interference, R2 is the limiting resistor.

In comparator circuit 2, R3 and R4 form the partial voltage circuit to output a voltage of +3.3V to the input port 4 of comparator U1. When the input port 3 gets +2.5V, i.e. the charging plug is connected, the port 1 of the comparator outputs a voltage of 0V, and the PNP transistor U2 will conduct and output a DCwakeUp signal of +5V to DC wake-up circuit. And when the input port 3 gets +5V, i.e. the charging plug is not connected, the port 1 of the comparator outputs a voltage of +5V, and the PNP transistor U2 will not conduct and output a DCwakeUp signal of 0V to DC wake-up circuit.

In DC wake-up circuit, if the signal of DCWakeUp is +5V, i.e. the charging plug is connected, the DC power U3 will be started and output a voltage Vout of +5V to drive the BMS to work. If the signal of DCWakeUp is 0V, i.e. the charging plug is not connected, the DC power U3 will output a voltage of 0V, and the BMS will maintain the low-power state. The power port Vin of the DC power is connected with the 12V power A+ of the charging plug.

The invention in which an exclusive property or privilege is claimed is defined as follows:

1. A charge wake-up circuit for a battery management system ("BMS") comprising:
    a DC wake-up circuit including an anti-reverse diode, a ground resistor, a limiting resistor, at least one filter capacitor, a regulator diode, and DC power, wherein the cathode of the anti-reverse diode is connected to the ground resistor and the limiting resistor, a port of the ground resistor is connected to ground, a port of the limiting resistor is connected to filter capacitor, a cathode of the regulator diode and a port of DC power, and a port of the filter capacitor and an anode of regulator diode are connected to the ground;
    a comparator circuit including a comparator, a transistor, and a plurality of resistors, wherein an inverting input of the comparator is connected to the first and second ones of the plurality of resistors, a port of the first one of the plurality of resistors is connected to voltage of +5V, a port of the second one of the resistors is connected to ground, the output of the comparator is connected to a third one of the plurality of resistors, a port of the third one of the resistors is connected to a fourth one or the plurality of resistors and the transistor, a port of the fourth one of the resistors and a collector of the transistor are connected to voltage of +5V, and an emitter of the transistor is connected to an anode of the anti-reverse diode;
    a charging plug connection circuit including at least first and second filter capacitors, a TVS diode, a resistor and a limiting resistor, wherein a charger port of the charging plug is connected to one port of the at least first filter capacitor, the TVS diode, the resistor and the limiting resistor, a second port of the filter capacitor and the TVS diode are connected to ground, a third port of the resistor is connected to a voltage of +5V, a port of the limiting resistor is connected to the filter capacitor and a positive input of the comparator, and a port of the filter capacitor is connected to the ground; and
    wherein the circuit is operative to wake up the BMS from the a low-power state to monitor a battery charging process.

* * * * *